United States Patent [19]
Barger et al.

[11] 4,307,064
[45] Dec. 22, 1981

[54] SOLVENT EXTRACTION APPARATUS

[75] Inventors: William M. Barger, Piqua, Ohio; Raymond L. Upchurch, Texarkana, Ak.

[73] Assignee: The French Oil Mill Machinery Company, Piqua, Ohio

[21] Appl. No.: 195,571

[22] Filed: Oct. 9, 1980

[51] Int. Cl.³ .............................................. B01D 11/02
[52] U.S. Cl. ................................ 422/267; 196/14.52; 422/269; 422/275; 422/281
[58] Field of Search ............... 422/267, 269, 273, 272, 422/275, 278, 281; 196/14, 52; 127/6, 7

[56] References Cited

U.S. PATENT DOCUMENTS

| | | | |
|---|---|---|---|
| 3,021,201 | 2/1962 | Upton | 422/278 |
| 3,131,202 | 4/1964 | Depmer | 260/412.8 |
| 3,533,837 | 10/1970 | Strich | 422/269 |
| 3,860,395 | 1/1975 | Kehse et al. | 422/278 |

*Primary Examiner*—Bradley Garris
*Attorney, Agent, or Firm*—Biebel, French & Nauman

[57] ABSTRACT

A continuous solvent extracting apparatus with a generally cylindrical stationary housing containing a plurality of stationary bottomless baskets disposed laterally adjacent one another in a circular pattern in a single stage with a screen forming the bottom of the baskets. The screen is mounted for rotation beneath the baskets with a single opening through which material being processed can be emptied from each of the baskets in sequence after the miscella has been removed from the material being treated by drainage through the screen. The miscella is collected in a pan which also rotates with the screen and includes a hopper in registry with the opening in the screen through which the processed material can pass from each of the baskets to a discharge opening from the extracting apparatus.

5 Claims, 6 Drawing Figures

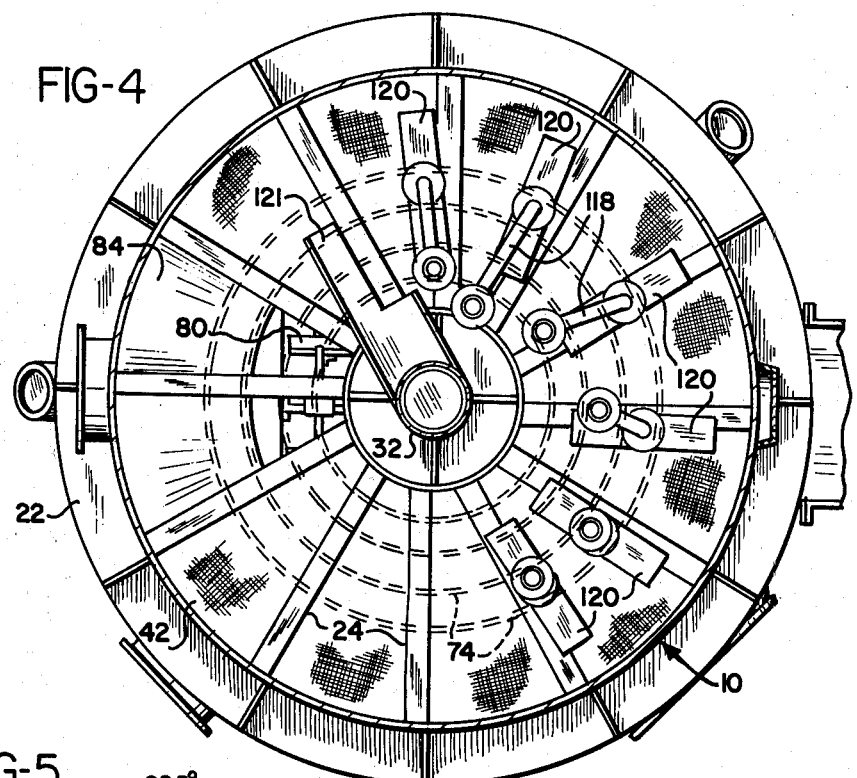
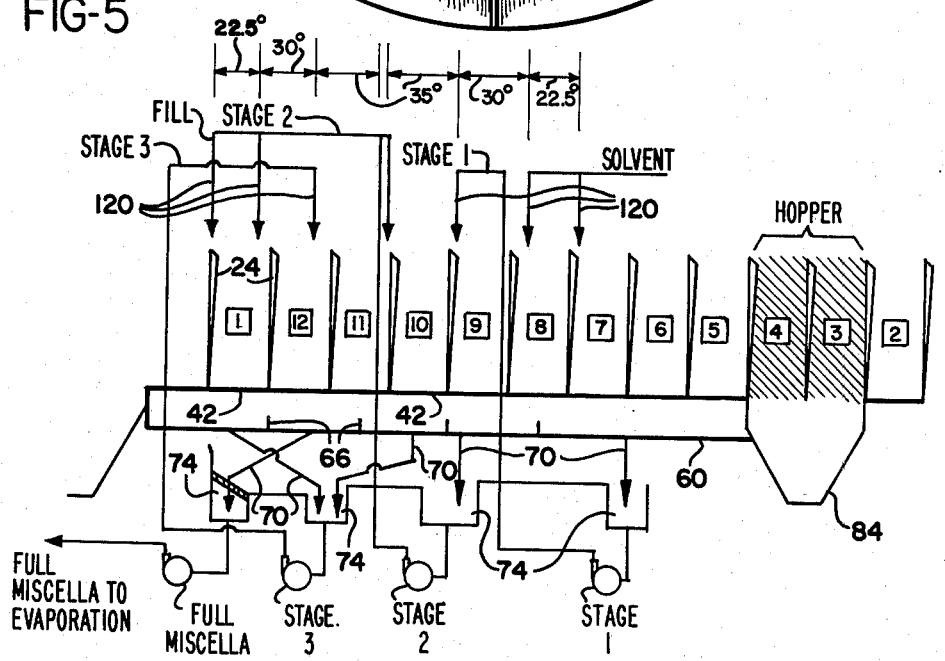

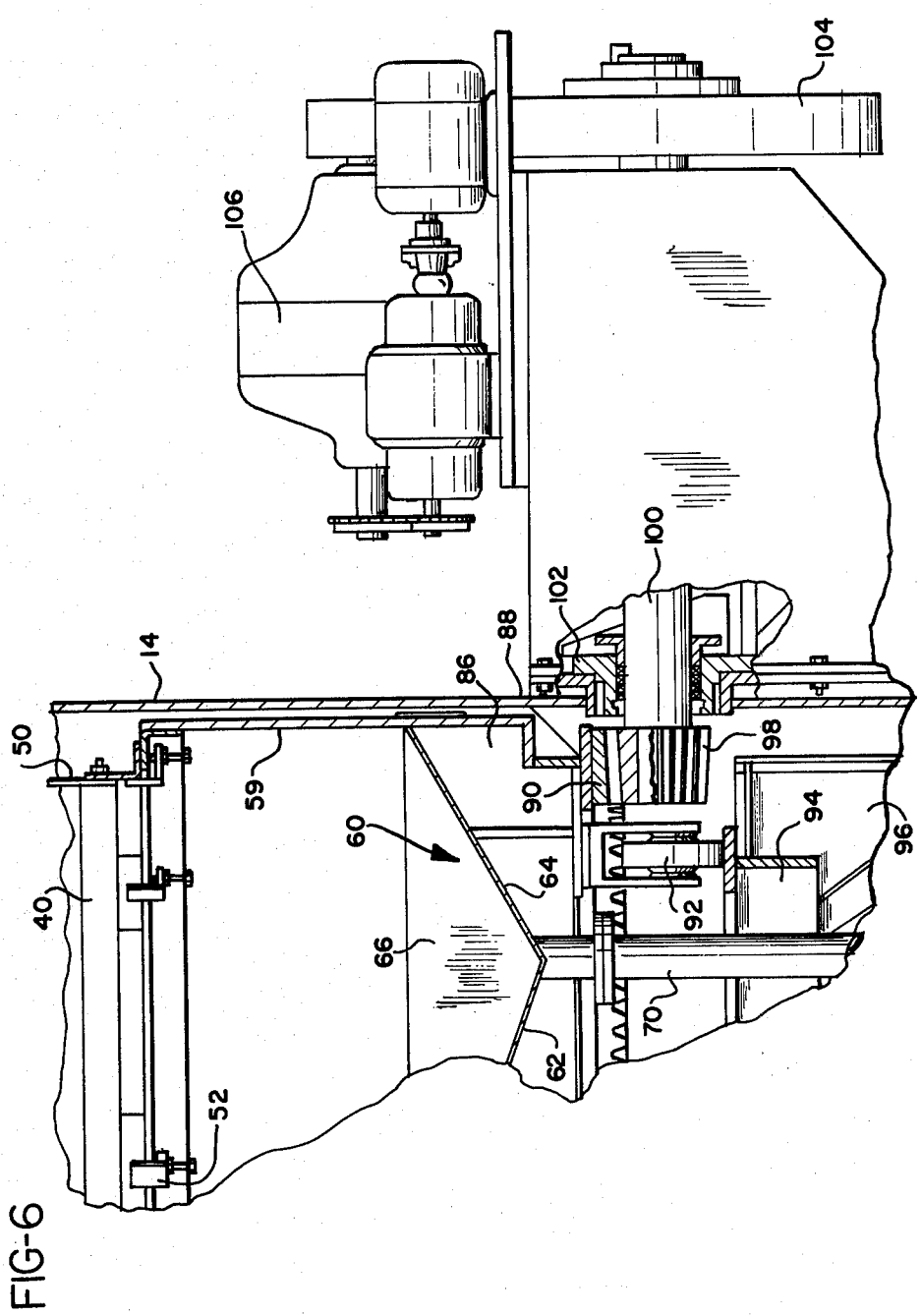

SOLVENT EXTRACTION APPARATUS

BACKGROUND OF THE INVENTION

1. Field of the Invention

The present invention relates to solvent extracting apparatus and, more particularly, to a single-stage, multiple-processing-station, extracting apparatus in which solvent and miscella of varying strength are applied to the material to be processed at each of the stations and then the processed material removed.

2. Prior Art

The percolation type of solvent extraction apparatus to which the present invention pertains, generally utilize a plurality of baskets in which the material from which oil is to be removed is contained. These baskets are then moved through a solvent and miscella distribution system which distributes the solvent and miscella over the surfaces of the material in the baskets and then collects the enhanced miscella from beneath a screened or perforated plate partition in the bottom of the baskets.

Such a device is illustrated, for example, in Depmer U.S. Pat. No. 3,131,202. In this type of device the material is placed in a plurality of segments in a cylindrical container with the segments forming baskets in the container. The bottom surface of the container is stationary, while the remainder of the cyclindrical container is rotated under a stationary miscella distribution system which applies the miscella to the surface of the material in the rotating baskets. The enhanced miscella then drains through the screen in the bottom of the baskets and is collected for recirculation or subsequent treatment. This type of device requires substantial power to rotate the heavy cylindrical containers which are filled with the material being processed and also tend to cause some vibration of the material which releases fines that enters into the miscella and detrimentally affects the recovery process.

One means of overcoming these difficulties has been provided by the type of apparatus disclosed, for example, in Upton U.S. Pat. No. 3,021,201. In this device the cylindrical container, which is segmented into a plurality of baskets, is maintained stationary. The screens likewise do not rotate but are hinged to fall downwardly out of the way to release the treated material from the baskets. A camming frame structure is rotated beneath the screens in order to sequentially pivot the screens downwardly to open each basket to permit the material being processed to be removed from the baskets. While the screens are in place beneath the baskets, the miscella is collected in a pan which rotates with the camming frame beneath the screens.

This system, however, requires a plurality of rollers associated with each of the pivoting screens, which ride on the camming frame, as well as requiring all of the hinges and associated hinge pins for each screen, which all tends to complicate the device and therefore requires an undesirable amount of labor to keep the equipment operational. However, this type of device does have an advantage over that previously described, in that the material being processed is maintained stationary during treatment so that the fines are generally not released into the miscella to the extent that occurs when the baskets are rotated.

SUMMARY OF THE INVENTION

The present invention overcomes the above described difficulties and disadvantages associated with the prior art devices by providing a plurality of stationary baskets with rotating screen bottoms which substantially reduces power consumption from the rotating basket type of extractor and which eliminates many of the parts necessary in the hinged bottom screen type of extractor, discussed above. In addition, the present invention has the further advantage of permitting the leading screen segments in the rotating screen bottom to be of a finer mesh than the remaining screen segments. The contamination of the miscella due to fines can thus be reduced due to the smaller mesh screen preventing finer material from passing through to the miscella collection device when the solvent and miscella is initially applied to the material being processed, which is where it is common for the greatest contamination to occur.

In the present invention, a plurality of baskets are formed in a cylindrical container by the use of internal radially extending partitioning walls. A miscella distribution system is mounted for rotation above the baskets for applying varying strengths of miscella and concentrated solvent to the upper surfaces of the material contained in each of the baskets. A disc-shaped screen is mounted for rotation beneath the baskets and forms the bottom of the baskets for supporting the material being processed. This screen is preferably composed of a plurality of pie-shaped segments which can easily be removed for servicing or replaced. A large opening is defined in one area of the screen and permits material which has been processed to be dropped into a hopper and subsequently into a collection trough for removal from the apparatus.

The hopper extends through the miscella collection pan, which is otherwise co-extensive with the screen for collecting miscella from each of the baskets. The pan and hopper rotate along with the screen and the pan is subdivided into a plurality of sections which collect varying strengths of miscella which drains through the screen. A miscella collection and distribution system is associated with the sections of the pan for collecting the varying strengths of miscella and returning them to the miscella distribution system above the baskets for further processing in a substantially conventional manner.

The disc-shaped screen and the collection pan are mounted to a ring gear extending completely around the outer periphery of the screen and collection pan. A pinion gear and drive motor rotates the ring gear which, in turn, rotates the pan, hopper and screen simultaneously beneath the baskets.

As mentioned above, it is preferable to have at least the first two screen segments of the disc-shaped screen with a finer mesh screen than the remaining segments since the greatest amount of fines is generally loosened from the material being treated in the first application of solvent and miscella to the material. These finer screens thus prevent more of the fines from contaminating the miscella while the subsequent larger mesh segments of screen permit a higher flow rate of miscella.

Other objects and advantages of the invention will be apparent from the following description, the accompanying drawings, and the appended claims.

BRIEF DESCRIPTION OF THE DRAWINGS

FIG. 4 is a horizontal sectional view along line 4—4 of FIG. 1, illustrating the miscella distribution system above the baskets;

FIG. 5 is a schematic diagram of the miscella flow distribution system of the preferred embodiment; and FIG. 6 is an enlarged partial vertical sectional view adjacent the drive motor, illustrating the ring and pinion gear beneath the collection pan and screen.

DETAILED DESCRIPTION OF THE PREFERRED EMBODIMENT

Figure 1:
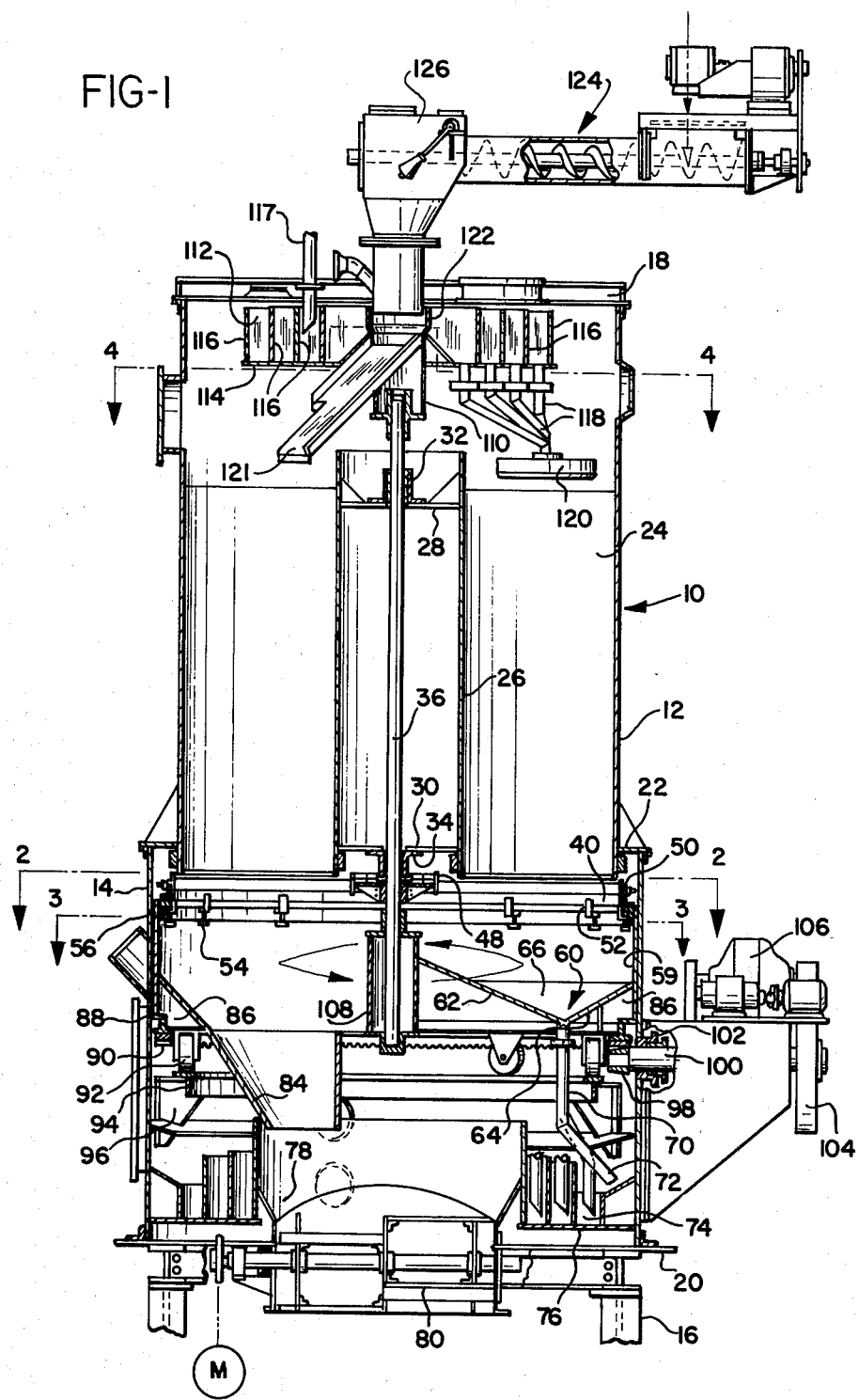
FIG. 1 is an elevation sectional view through the preferred embodiment of the present invention.

As shown in FIG. 1, the extractor apparatus 10 of the present invention has a main cylindrical housing 12 rigidly mounted on a cylindrical base 14 which, in turn, is mounted on a rigid supporting frame 16 constructed of I-beams and angle irons to rigidly support the entire apparatus. The cylindrical housing 12 is closed at its upper end by a sealing cap 18 which sealingly engages the upper surface of cylindrical housing 12 in order to provide an air-tight container due to the volatile nature of the typical solvents utilized in the extraction process. Likewise, the lower end of the cylindrical base 14 is provided with a sealing plate 20 in order to seal off the entire working inside area of the apparatus. A sealing ring 22 extends completely around the apparatus to seal the gap between the cylindrical housing 12 and the larger diameter cylindrical base 14.

Inside the cylindrical housing 12 are a plurality of vertical, radially extending partitions 24 which divide the housing into a plurality of baskets, for example 12, as is illustrated in the preferred embodiment. The upper edges of the partitions 24 terminate a distance beneath the sealing cap 18 sufficient to permit the miscella distribution system and the material processing system to be positioned between these upper edges and the cap, as described below.

An internal cylindrical support wall 26 is provided concentrically within the housing 12. The partitions 24 span the distance between the cylindrical support wall 26 and the cylindrical housing 12 and are welded thereto to provide rigid separate baskets around the inside of the housing. Top and bottom closure plates 28 and 30, respectively, are welded to the inside of the cylindrical support wall 26 to prevent accumulation of miscella within the cylindrical support wall 26. Sealing rings and bearings 32 and 34, respectively, are provided around corresponding openings in the top and bottom closure plates 28 and 30 to accommodate the central rotating shaft 36 which rotates both the miscella distribution system and material supply system, which are described in more detail below.

Figure 2:
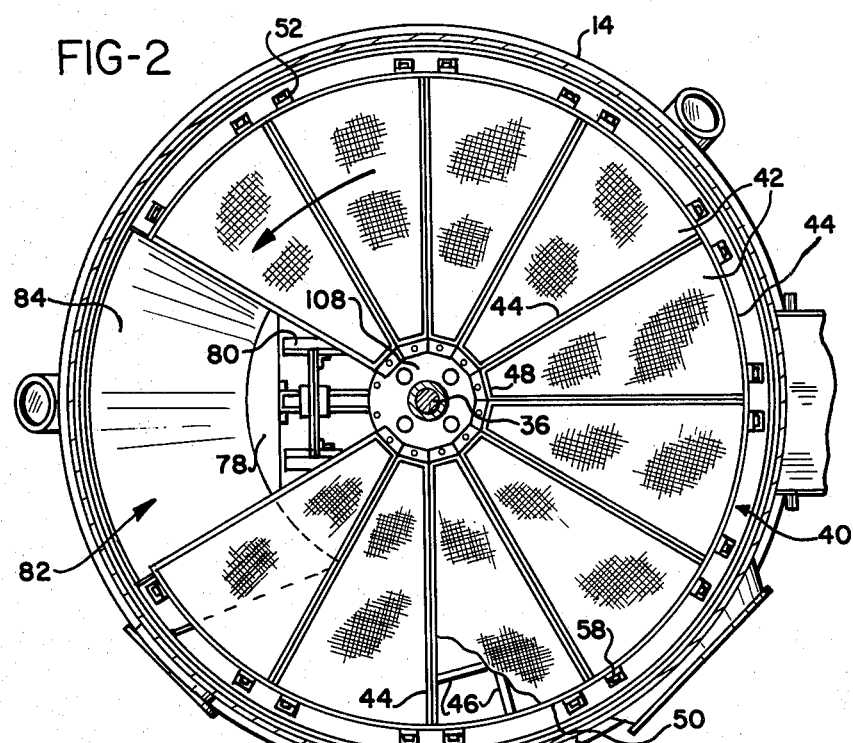
FIG. 2 is a horizontal sectional view in the direction of line 2—2 of FIG. 1, illustrating the disc-shaped screen.

Disposed beneath the cylindrical housing 12 within the cylindrical base 14 is a disc-shaped screen 40 which is formed from a plurality of pie-shaped screen segments 42. As seen in FIG. 2, each of these segments 42 is formed from a rigid frame with radially extending side braces 44 and internal tangentially extending cross braces 46 which support the screen surface. The screen can be of any material and design sufficient to support the material being processed in the baskets while permitting the desired flow rates of miscella through the screen, but in the preferred embodiment the screen segments 42 are formed of wedge wire of conventional construction. The first two segments in the direction of rotation of the screen 40 are preferably a 60 mesh screen while the others are preferable 80 mesh, although this can be adjusted significantly depending on the material being processed and the miscella flow rate desired.

Referring again to the screen frame structure of the preferred embodiment, the innermost end plate 48 of the frame structure and the curved outermost peripheral plate 50 are welded to the ends of the side braces 44 of the frame structure of the screen, and extend slightly above the screen surface, as best seen in FIG. 1, to overlap the bottom edge of the cylindrical housing wall to prevent splashing of the miscella between the screen and the housing wall. Each of the screen segments 42 has a plurality of L-shaped brackets 52 welded by their legs to the inside surface of plates 50 with the foot portion of the depending bracket extending outwardly and having a bolt and locknut assembly 54 threaded in a hole therein for engaging a peripheral support ring 56 for mounting the screen assembly 40. A further plurality of L-shaped brackets 58 are bolted on the outer surface of plate 50, as shown in FIG. 2, for engaging the upper surface of the ring 56 so that when the bolt and locknut arrangements 54 are tightened they capture the ring between the two corresponding L-shaped brackets 52 and 58 to hold the screen assembly 40 rigidly to the ring 56.

The ring 56, which has an L-shaped cross section, is, in turn, welded to the upper edge portion of a cylindrical wall 59 forming the outer wall of the miscella collection pan 60. The bottom of the pan 60 is formed by two downwardly converging arcuate plates 62 and 64 which form a trough around the pan beneath the screen assembly 40. A plurality of radially extending vertical partitions 66 are welded at spaced locations around the plates 62 and 64 to provide separate compartments within the collection pan 60. Holes 68 are in each of the separate compartments between the partitions 66 for draining the miscella from the collection pan. A plurality of drainage tubes 70 are welded to the bottom of the pan at each hole 68 with the lower portions 72 of each tube being bent at different angles to direct the fluid from the separate compartments in the collection pan into different cylindrical channels 74 which contain different concentrations of miscella. The channels 74 are formed by a stationary base plate 76 welded to the inside of cylindrical base 14 and a plurality of vertically extending cylindrical walls of varying height. The innermost cylindrical wall 78 forms the collection trough for processed material which is removed from the apparatus by a mechanical picker 80 of conventional construction.

Referring again to the construction of the miscella collection pan 60, the processed material is emptied from the individual baskets in the cylindrical housing 12 through an opening 82 in the screen assembly 40 which is formed by adjacent screen segments 42 and provides an opening of approximately the area of two of the screen segments. A hopper 84 is formed in the collection pan 60 in registry with the opening 82 to allow the processed material to pass directly to the collection trough 78.

To support the miscella collection pan 60 and the screen assembly 40 for rotation, a plurality of equally angularly spaced brackets 86 are welded to the outer surface of plates 64 and, in turn, have a T-shaped cross sectional ring member 80 welded thereto with a ring gear 90 bolted to the bottom of the T-shaped ring 88. A plurality of rollers 92 are also rigidly supported by the brackets 86 and ride on a further T-shaped cross section ring 94 supported on further angle brackets 96 welded to the inside walls of cylindrical base 14.

To rotate the screen assembly 40 and miscella collection pan 60, a pinion gear 98 is positioned in engagement with the ring gear 90 and supported on a shaft 100 which is mounted in the side wall of a cylindrical base 14 through a bearing and seal arrangement 102. The shaft is coupled through a gear reduction unit 104 to the drive motor 106.

The central shaft 36 which supports the miscella distribution apparatus and screen assembly, as previously mentioned, is supported in a hub section 108 of the miscella collection pan assembly 60 for rotation therewith and extends up through the bearing and seal arrangements 32 and 34 to the upper portion of cylindrical housing 12. A further central hub 110 is mounted to the upper end of shaft 36 for rotation therewith and, in turn, supports a plurality of miscella distribution channels 112. The channels 112 are formed from a base plate 114, which is secured to the hub 110, and a plurality of concentric vertically extending cylindrical walls 116. A plurality of stationary input tubes, such as tube 117 (only one of which is shown) are mounted to the upper cap 18 and extend into the corresponding channels 112 for distributing miscella received from the channels 74 through a pumping arrangement which is described below in connection with FIG. 5. Each of the channels 112 is provided with openings in the base plate 114 through which the miscella of varying strengths may pass into the plurality of tubes 118 each of which is fitted with a spray head 120 for distributing the miscella over the surface of the material being processed.

The principles utilized for collection of miscella in the channels 74 and their distribution through the channels 112 and associated nozzles or spray heads 120 is substantially conventional in that it utilizes the well known counterflow principles whereby the material which has just been deposited in its baskets or containers is treated with miscella which has already acted on other batches of material and which contains a relatively large quantity of extracted material, and then step by step the material is treated with miscella containing less dissolved material and finally the material is treated with clear solvent just before it is discharged from the apparatus.

The miscella flow collection and distribution system as well as the material to be processed distribution system, in relation to the twelve baskets of the preferred embodiment are illustrated in FIG. 5. Each of the twelve baskets of the preferred embodiment are numbered in the squares, with the nozzles 120 as indicated by the arrows, are aligned with an indicated basket in the rotational cycle as are the associated compartments formed in the collection pan 60 by the partitions 66. The tube 70 extending from the openings in each of the compartments formed in collection pan 60 are shown extending into the associated channels 74 from which the various strengths of miscella collected are pumped through the pumps illustrated back to the miscella filling distribution system above the baskets. The scale above the nozzles 120 illustrates the degrees of rotation during which the nozzles are positioned over each of the baskets. This relationship, of course, stays constant as the miscella distribution system and collection pan are rotated above and below the stationary baskets.

Although the distribution set-up illustrated schematically in FIG. 5 is the preferred form, it is to be understood that variations in the application of solvent and varying strengths of miscella can be adjusted if desired in order to more efficiently treat certain types of material being processed. Also, although the preferred embodiment is illustrated and described as having twelve baskets, any desired number of baskets may be utilized.

Referring more particularly to FIG. 1, the material to be processed, such as a slurry of flakes and some miscella as it is received from other equipment in a typical processing plant, is introduced through a trough 121 mounted for rotation to the hub 110 and having a central cylindrical receiving opening 122 concentric with shaft 36 into which the material to be processed is dumped for distribution into the various baskets defined in housing 12. The material to be processed can be fed to the opening 122 in any manner, although a feed screw arrangement 124 is illustrated which feeds material to the hopper 126 positioned directly above the opening 122 and dumps the processed material onto the trough 121 as it is rotated.

Figure 3:
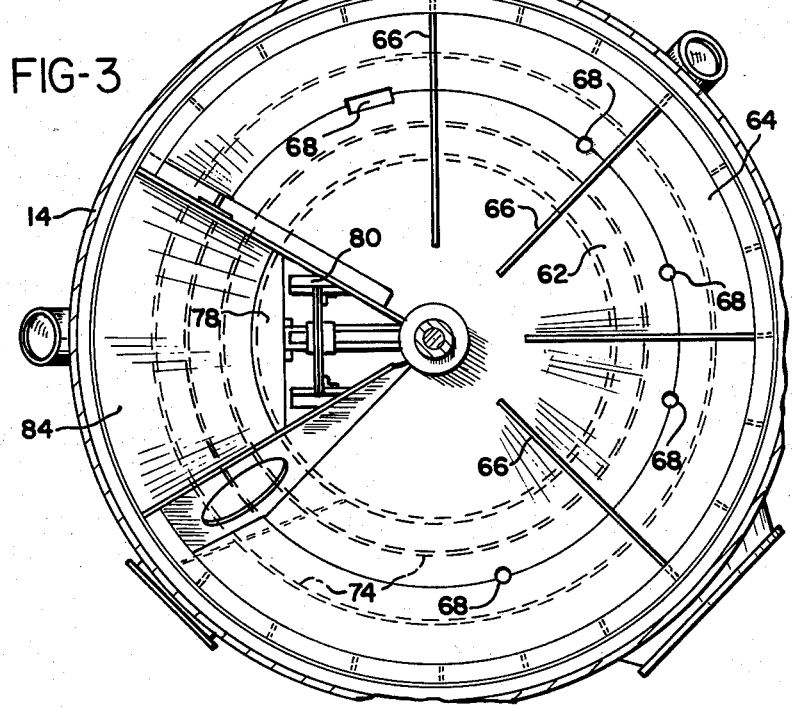
FIG. 3 is a horizontal sectional view along line 3—3 of FIG. 1, illustrating the miscella collection pan.

As shown in FIG. 3, the trough 121 is positioned in advance of the miscella distribution nozzles 120, in the direction of rotation thereof which is counterclockwise, as viewed in FIG. 3, and immediately behind the opening 82 defined in the screen assembly 40. Thus, as the screen assembly, material distribution trough 121 and nozzles 120 are rotated, the material which has already been processed is first dumped into the hopper 84. The screen then continues to rotate so as to cover the bottom of the compartment or basket just emptied, and the material distribution trough 121 then fills the basket.

As the screen and trough 121 continue to rotate, the miscella distribution nozzles 120 pass over the upper region of the baskets and spray miscella onto the material in the sequence illustrated in FIG. 5. As shown in FIG. 3, three of the baskets are not provided with miscella in advance of the movement of the opening 82 in the screen, and hopper 84 under the baskets, so that the miscella applied to the upper surface of the material has an adequate time to drain before the processed material in released from the baskets.

While the form of apparatus herein described constitutes a preferred embodiment of this invention, it is to be understood that the invention is not limited thereto, and that changes may be made therein without departing from the scope of the invention.

What is claimed is:

1. In a continuous solvent extracting apparatus having a generally cylindrical stationary housing, a plurality of stationary bottomless baskets mounted within said housing and disposed laterally adjacent one another in a circular pattern in a single stage; screening means beneath said baskets forming end closures therefore for retaining material to be processed therein and passing miscella therethrough, a miscella collecting pan beneath said screening means, means for distributing miscella to said baskets and means for removing processed material from said baskets, wherein the improvement comprises:

said screening means having a substantially horizontal disc-shaped screening surface mounted for rotation beneath said baskets with a single opening defined therein substantially co-extensive with the lower extremity of at least one basket when disposed in registry therewith for successively emptying processed material from each said basket as said screening means is rotated;

said pan defining a hopper therein in registry with said opening and mounted for rotation with said screening means, and;

means for simultaneously rotating said screening means and pan.

2. The improvement of claim 1, including:

a material feed trough mounted for rotation above said baskets for successively filling said baskets with material to be processed as said trough is rotated;

a plurality of liquid distribution tubes mounted above said baskets for rotation in the same direction as and following said trough and disposed in horizontally spaced relation from one another;

means for supplying solvent to said tubes;

said pan having a plurality of partitions therein separating said pan into a plurality of compartments a first of which is disposed adjacent one side of said hopper and directly beneath said trough and the remainder of which extend around said pan to an opposite side of said hopper; and means for receiving miscella from said pan compartments and delivering the same to said tubes so that the most enhanced miscella is introduced to the tube closest to said trough and progressively weaker miscella is introduced through subsequent tubes.

3. The improvement of claim 1 wherein said screening means includes:

a plurality of rigid screen segments each with a generally pie-shaped horizontal configuration and rigidly secured together.

4. The improvement of claim 3 including at least a first two of said segments in the direction of rotation of said screening means having a finer screening surface than the rest of said segments.

5. A continuous solvent extracting apparatus, comprising:

a vertically extending stationary cylindrical housing;

a plurality of vertically disposed radially extending stationary walls within said housing and abutting internal walls of said housing to form a plurality of open bottom baskets in a circular pattern with the lower edges of said radially extending walls being in a common plane;

a screen mounted for rotation beneath said lower edges of said radially extending walls and closely adjacent thereto for forming a bottom closure on said baskets and having a single pie-shaped opening defined therein generally co-extensive with the bottom of at least one of said baskets when in registry therewith for passing processed material out of said baskets in succession as said screen is rotated;

a miscella collecting pan disposed beneath said screen and mounted for rotation therewith and having a hopper defined therein in registry with said pie-shaped opening in said screen for allowing processed material to pass therethrough;

means below said pan for collecting said processed material passed from said baskets;

means for supplying solvent to an upper portion of said baskets so as to pass through the material being processed and produce miscella;

means for receiving miscella in said pan after it has passed through the material being processed and for distributing the miscella at a remote location; and means for simultaneously rotating said screen and pan.

* * * * *